(12) United States Patent
Devdas et al.

(10) Patent No.: US 10,805,767 B2
(45) Date of Patent: Oct. 13, 2020

(54) METHOD FOR TRACKING THE LOCATION OF A RESIDENT WITHIN A FACILITY

(71) Applicant: PHILIPS NORTH AMERICA LLC, Andover, MA (US)

(72) Inventors: Vikram Devdas, Vancouver (CA); Shane McNamara, Vancouver (CA); Andriy Kanyuka, Vancouver (CA)

(73) Assignee: PHILIPS NORTH AMERICA LLC, Andover, MA (US)

( * ) Notice: Subject to any disclaimer, the term of this patent is extended or adjusted under 35 U.S.C. 154(b) by 104 days.

(21) Appl. No.: 15/844,356

(22) Filed: Dec. 15, 2017

(65) Prior Publication Data

US 2018/0367952 A1  Dec. 20, 2018

Related U.S. Application Data

(60) Provisional application No. 62/434,853, filed on Dec. 15, 2016.

(51) Int. Cl.
| | |
|---|---|
| G08B 1/08 | (2006.01) |
| H04W 4/029 | (2018.01) |
| G08B 21/04 | (2006.01) |
| G01S 5/00 | (2006.01) |
| G06F 16/00 | (2019.01) |
| H04W 4/33 | (2018.01) |
| G08B 21/02 | (2006.01) |

(52) U.S. Cl.
CPC .............. *H04W 4/029* (2018.02); *G01S 5/00* (2013.01); *G06F 16/00* (2019.01); *G08B 21/043* (2013.01); *G08B 21/0446* (2013.01); *G08B 21/0272* (2013.01); *G08B 21/0453* (2013.01); *H04W 4/33* (2018.02)

(58) Field of Classification Search
CPC ....... H04W 4/029; H04W 4/33; G08B 21/043
See application file for complete search history.

(56) References Cited

U.S. PATENT DOCUMENTS

| | | | | |
|---|---|---|---|---|
| 7,323,991 | B1 * | 1/2008 | Eckert | G07C 9/28 340/572.1 |
| 9,125,019 | B1 * | 9/2015 | Heikkila | H04W 4/029 |
| 9,215,560 | B1 * | 12/2015 | Jernigan | G01P 15/00 |
| 9,967,701 | B1 * | 5/2018 | Barfield, Jr. | G01C 21/005 |

(Continued)

*Primary Examiner* — Quang Pham

(57) ABSTRACT

A variation of a method for tracking locations of residents within an assisted-care facility includes accessing pressure data recorded by wearable devices at known locations within the assisted-care facility; correlating the pressure data with known locations within the assisted-care facility to generate a map of pressure data at various locations within the assisted-care facility; accessing a first pressure value recorded by a first wearable device assigned to a first resident of the assisted-care facility at approximately the first time and representing a local pressure proximal the first wearable device at a first time; estimating a first location of the first wearable device within the assisted-care facility at approximately the first time based on alignment between the first pressure value and pressure data represented in the map; and recording the first location and a first resident identifier of the first resident assigned to the first wearable device to a database.

19 Claims, 4 Drawing Sheets

(56) References Cited

U.S. PATENT DOCUMENTS

| | | | |
|---|---|---|---|
| 2008/0294019 A1* | 11/2008 | Tran | A61B 5/04005 600/301 |
| 2009/0138336 A1* | 5/2009 | Ashley, Jr. | G08G 1/20 455/456.1 |
| 2009/0273455 A1* | 11/2009 | Sweeney | A61B 5/1113 340/286.07 |
| 2011/0125535 A1* | 5/2011 | Gross | G16H 10/60 705/3 |
| 2012/0072110 A1* | 3/2012 | Venkatraman | G01S 5/0252 701/434 |
| 2012/0268269 A1* | 10/2012 | Doyle | G08B 21/0272 340/539.13 |
| 2013/0045685 A1* | 2/2013 | Kiani | G16H 10/65 455/41.2 |
| 2014/0114567 A1* | 4/2014 | Buchanan | H04W 4/029 701/454 |
| 2014/0114624 A1* | 4/2014 | Buchanan | G01W 1/02 703/2 |
| 2014/0135040 A1* | 5/2014 | Edge | G01C 5/06 455/456.6 |
| 2014/0235269 A1* | 8/2014 | Ericsson | H05B 47/19 455/456.1 |
| 2014/0278220 A1* | 9/2014 | Yuen | A61B 5/4812 702/150 |
| 2015/0002292 A1* | 1/2015 | Cavalcanti | G08B 21/0211 340/539.12 |
| 2015/0133145 A1* | 5/2015 | Palanki | G01C 25/00 455/456.1 |
| 2016/0021506 A1* | 1/2016 | Bonge, Jr. | A01K 27/009 717/173 |
| 2016/0050531 A1* | 2/2016 | Choi | H04W 4/027 455/456.2 |
| 2016/0165409 A1* | 6/2016 | Bulut | G06Q 30/0261 715/734 |
| 2016/0234644 A1* | 8/2016 | Belghoul | G01S 5/0027 |
| 2016/0258749 A1* | 9/2016 | MacGougan | G01S 19/45 |
| 2017/0038787 A1* | 2/2017 | Baker | H05B 37/0272 |
| 2017/0225921 A1* | 8/2017 | Scoville | B66B 5/0018 |
| 2017/0289649 A1* | 10/2017 | Alessi | H04Q 9/00 |
| 2017/0332192 A1* | 11/2017 | Edge | G01S 5/0036 |
| 2018/0012471 A1* | 1/2018 | Bauer | H04W 4/029 |
| 2018/0073951 A1* | 3/2018 | Venkatraman | G01C 5/06 |
| 2018/0084374 A1* | 3/2018 | Jain | H04W 4/02 |

* cited by examiner

METHOD FOR TRACKING THE LOCATION OF A RESIDENT WITHIN A FACILITY

CROSS-REFERENCE TO RELATED APPLICATIONS

This Application claims the benefit of U.S. Provisional Application No. 62/434,853, filed on 15 Dec. 2016, which is incorporated in its entirety by this reference.

TECHNICAL FIELD

This invention relates generally to the field of indoor location services and more specifically to a new and useful method for tracking the location of a resident within a facility in the field of indoor location services.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
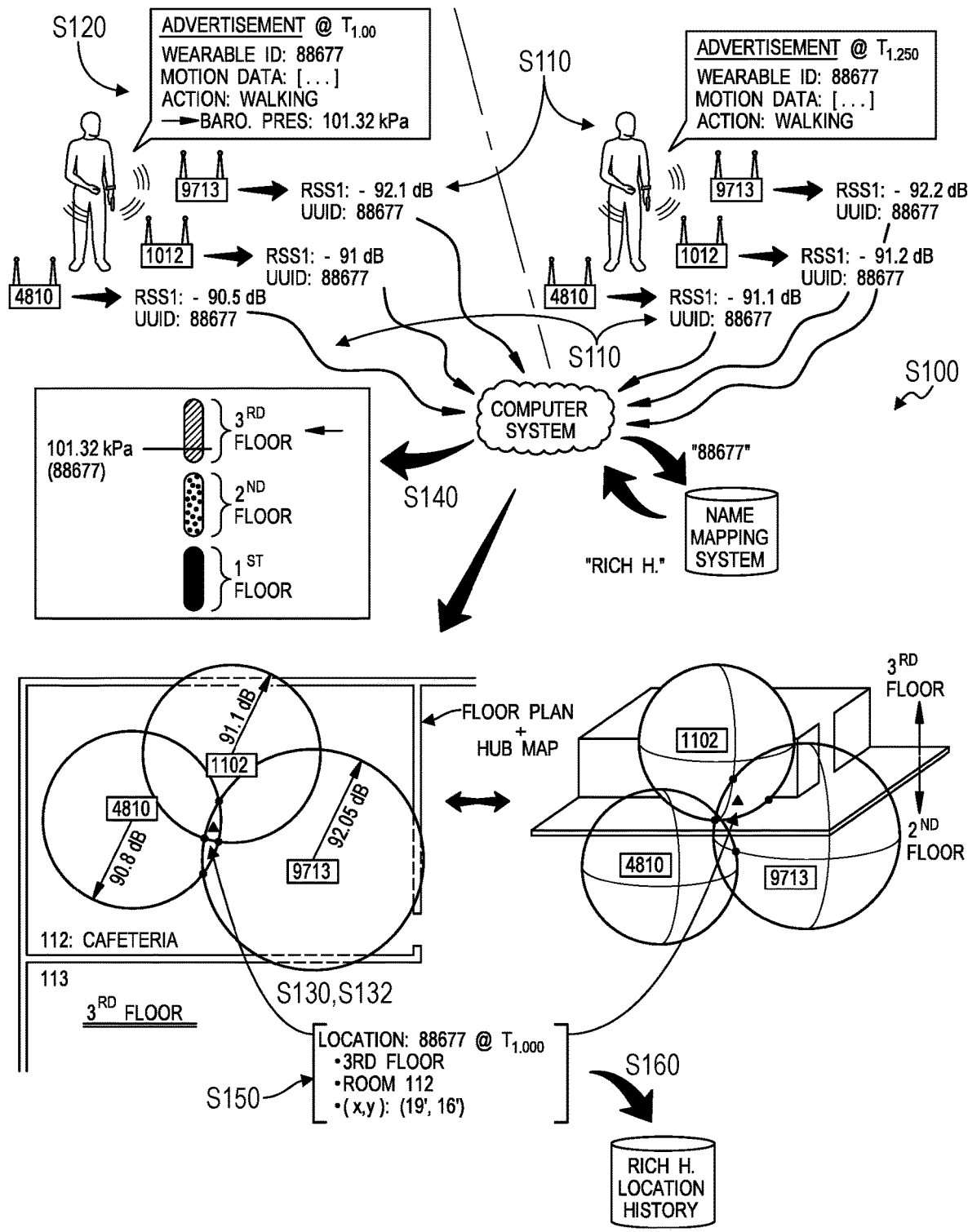
FIG. 1 is a flowchart representation of a method.
Figure 2:
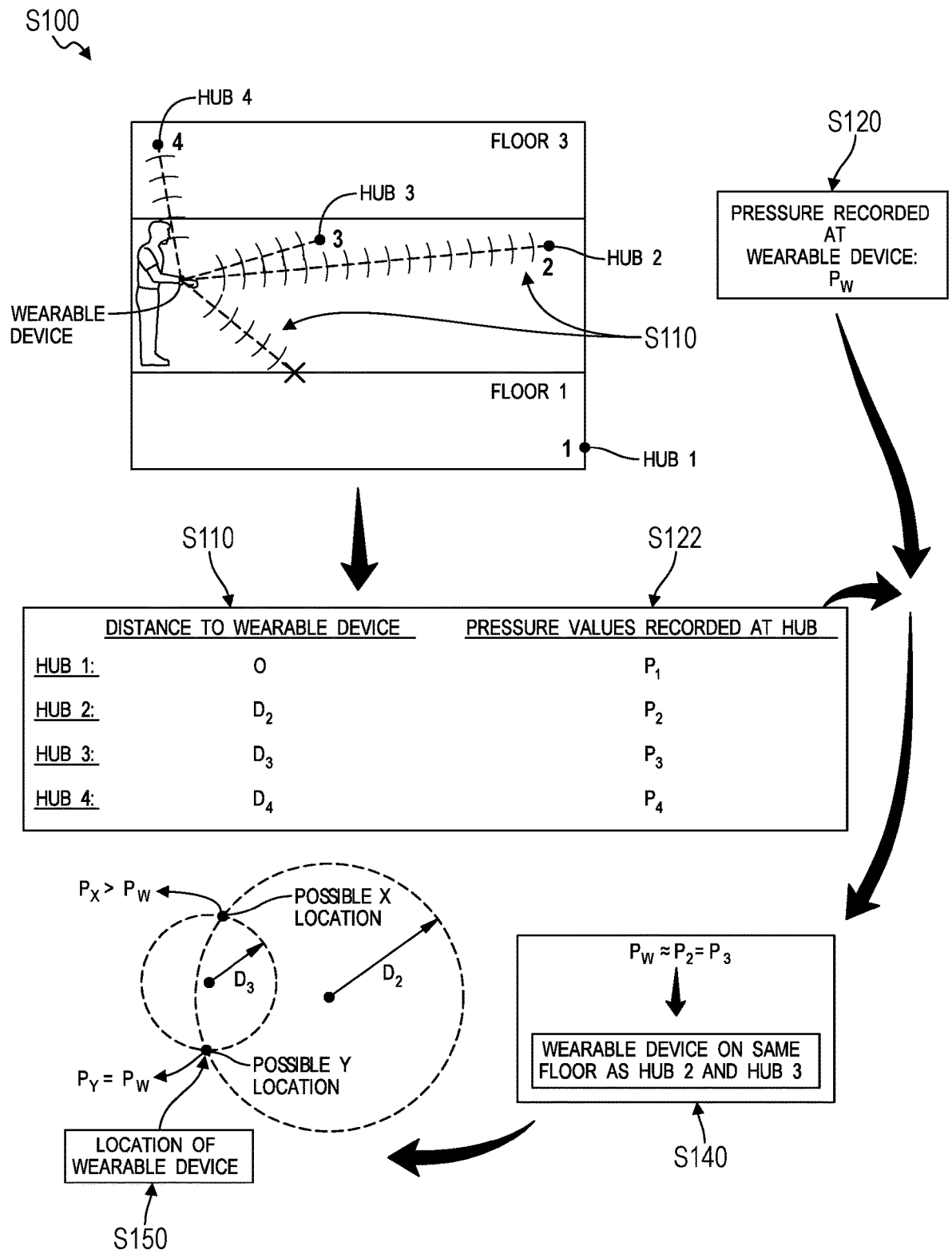
FIG. 2 is a flowchart representation of a variation of the method.

As shown in FIGS. 1 and 2, a method S100 for tracking locations of residents within an assisted-care facility includes: accessing a first distance value representing a distance from a first hub arranged within the assisted-care facility to a first wearable device based on a first wireless signal transmitted between the first wearable device and the first hub at a first time in Block S110; accessing a first pressure value recorded by the first wearable device at approximately the first time and representing a local pressure proximal the first wearable device at approximately the first time in Block S120; accessing a second pressure value recorded by the first hub at approximately the first time and representing a local pressure proximal the first hub at approximately the first time in Block S122; calculating a vertical position of the first wearable device within the assisted-care facility at approximately the first time based on a difference between the first pressure value and the second pressure value in Block S140; calculating a location within the assisted-care facility occupied by the first wearable device at approximately the first time based on the first distance value and the vertical position occupied by the first wearable device at approximately the first time in Block S150; and recording the location, a timestamp for the first time, and a first identifier assigned to the first wearable device to a database in Block S160.

Figure 3:
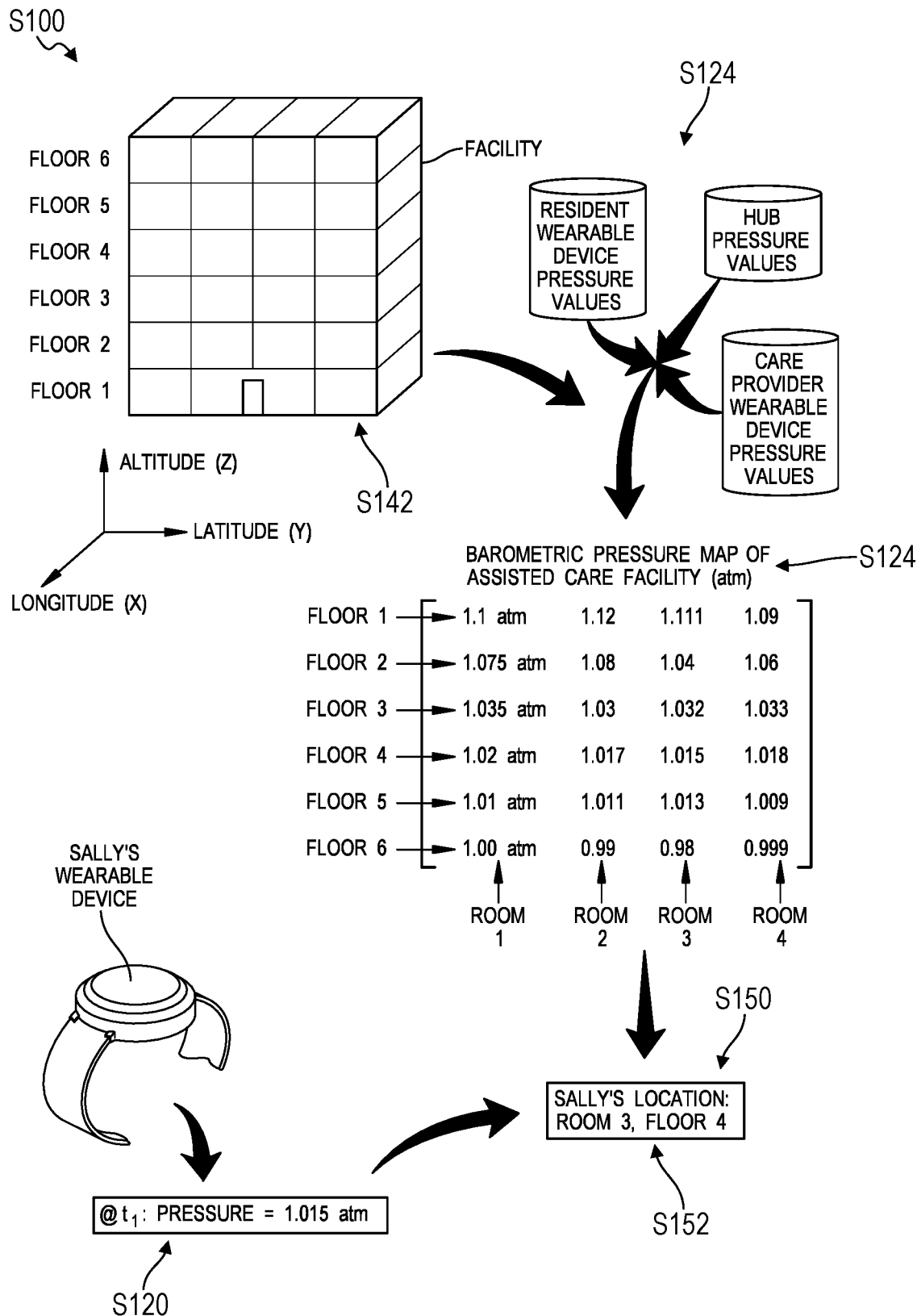
FIG. 3 is a flowchart representation of a variation of the method.

A variation of the method S100 shown in FIG. 3 further includes: accessing pressure data recorded by wearable devices at known locations within the assisted-care facility in Block S124; correlating the pressure data with known locations within the assisted-care facility to generate a map of pressure data at various locations within the assisted-care facility in Block S142; and estimating a first location of the first wearable device within the assisted-care facility at approximately a first time based on alignment between the first pressure value and pressure data represented in the map in Block S152.

2. Applications

Generally, a wearable device, a network of hubs, and a computer system (hereinafter a "system") can execute Blocks of the method S100 to calculate the location (i.e., latitude, longitude, and altitude) of a wearable device within an assisted-care facility and, therefore, the location of a resident of an assisted-care facility (hereinafter the "facility")—wearing the wearable device—within the facility substantially in real-time based on pressure data collected by the network of hubs and the wearable device as well as distance data extracted from wireless signals communicated between the network of hubs and the wearable device. The system can the confirm the location of the wearable device and generate a three-dimensional map of the facility representing current locations of residents within the facility.

In particular, a resident's wearable device can intermittently broadcast an advertisement, and a hub (e.g., a wall-mounted computing device) within the facility can receive advertisements from the wearable device. The system can then transform measured values of such wireless communication with the wearable device into a value representing an approximate distance between the hub and the wearable device (hereinafter a hub-to-wearable device "distance value"). During a period of time, hubs within the facility can pass multiple hub-to-wearable device distance values for the wearable device to the system, and the system—remote from the hubs and wearable device—can: transform each set of hub-to-wearable device distance values—recorded at approximately the same time and received from multiple hubs within the facility—into an approximate location of the wearable device relative to the hub at the corresponding time; and merge the approximate locations into a determined location of the wearable device at the corresponding time. The wearable device can also intermittently sample an integrated barometric pressure sensor or altimeter. The wearable device can intermittently broadcast pressure values to local hubs, which can pass these pressure values to the system. The system can compare a pressure value received from the wearable device—via a hub—to pressure values recorded at the hub (i.e., through an integrated pressure sensor within the hub), pressure values recorded at other wearable devices assigned to other residents of the facility, a pressure map of the facility, etc. to determine which floor the resident is currently occupying and confirm (or refute) a determined location of the resident accordingly. The system can transform a pressure value received from the wearable device into a current altitude (e.g., a particular floor) of the wearable device and implement this altitude value as an additional confirmation data point in transforming hub-to-wearable device distance values into a current location of the wearable device.

By merging hub-to-wearable device distance values for a particular wearable device received from multiple hubs over a period of time with pressure data recorded by the wearable device, the system can transform a single (non-directional) distance value representing a distance between one hub and a wearable device into a directional vector (i.e., from the hub to the wearable device) pointing to location occupied by the wearable device. Furthermore, the system can reduce errors in a determined location of the wearable device (e.g., to within two to five feet of an actual location of the wearable device). The system can locate a volume (e.g., a sphere) of possible locations of a wearable device within a facility based on the wearable device's proximity to reference points defined by a one or more hubs arranged in known locations—at known heights on known walls of known rooms on known floors—within the facility. The system can then narrow the volume of possible locations of the wearable device to within a single plane (e.g., a horizontal plane at a particular altitude) of the facility based on a pressure value recorded at the wearable device relative to pressure values recorded by hubs or other wearable devices at known locations within the facility. Therefore, the system can accurately and repeatably locate the wearable device in three-dimensions (i.e., both vertically and horizontally) within the facility.

For example, the system can include multiple hubs arranged on discrete floors of a multi-floor assisted-care facility. In this example, a hub on a second floor of the assisted-care facility can communicate with wearable devices on a first floor below the second floor and wearable device on the second floor. The system can extract distance values from wireless signals communicated between the hub on the second floor and a wearable device on the first floor, a wearable device on the second floor, and a wearable device on the third floor. In this example, the system can detect that a first distance value representing a linear signal flight distance between the hub and the wearable device on the first floor equals a second distance value representing a linear signal flight distance between the hub and the wearable device on the second floor. From the first distance value and the second distance value, the system can define two coincident volumes (e.g., represented as a sphere) of possible locations of the wearable device on the first floor and of the wearable device on the second floor within the facility despite the wearable device on the first floor at a distinct location from the wearable device on the second floor. The system can access pressure values recorded at the wearable device on the first floor and pressure values recorded at the wearable device on the second floor to locate a vertical position (or altitude) of each wearable device within the facility. The system can then narrow the volume of possible locations of the wearable device on the first floor to locations aligned with the calculated vertical position of the wearable device on the first floor. Similarly, the system can narrow the volume of possible locations of the wearable device on the second floor to locations aligned with the calculated vertical position of the wearable device on the second floor. Therefore, the system can locate each wearable device relative to hubs within the facility and based on pressure values recorded at each wearable device.

The system can also crowdsource distance values and/or pressure data from resident wearable devices, care provider wearable devices, and/or static hubs affixed to infrastructure of the facility with integrated wireless communication modules and integrated pressure sensors distributed throughout the facility. Therefore, the system can aggregate (i.e., merge) distance values from a variety of sources—at known locations within the facility—to locate a particular resident wearable device to reduce error of the calculated location of the wearable device.

Once the location of the wearable device is thus determined and confirmed, the system can write this location to a location history database specific to a resident assigned the wearable device. The system can thus amass a history of locations within the facility occupied by the resident over time, such as in the form of a map of the facility containing timestamped points occupied by the resident over a period of time (e.g., one hour, one day, one week, one month, one year, etc.). With accurate location data, the system can monitor locations of fall events and other incidents in which a particular resident is involved and extract trends in these fall events and other incidents overtime. By recording location data to the location history database, the system can extract trends in each resident's short-, mid-, and long-term mobility and other location-dependent behaviors to gauge each resident's overall well-being and identify changes in each resident's mobility over time.

The system can implement similar methods and techniques to track and record the location of each care provider within the facility over time. The system can thus access a last known location of a resident from the resident's location history database if the resident is determined to have wandered out of or absconded from the facility, identify a nearest care provider from location data stored in various location history databases of care providers at the facility, and dispatch one or more nearby care providers to the last known location of the resident in order to assist the resident in returning to the facility. Similarly, the system can access a last known location of a resident from the resident's location history database if the resident is determined to have fallen or experienced a medical emergency, identify a nearest care provider from location data stored in various location history databases of care providers at the facility, and dispatch one or more nearby care providers to the last known location of the resident in order to care for the resident or to respond to the resident's medical emergency. Therefore, by collecting resident and care provider indoor location data and storing this data over time, the system can enable (or execute) rapid decisions and rapid responses to locale event, alarms, or emergencies within the facility.

Blocks of the method S100 can be executed by a system, such as by a local computer system within an assisted-care facility (e.g., a local server), by a remote server (e.g., "in the cloud"), or by a distributed computer network, etc. (hereinafter "computer network"). In particular, the system can interface with multiple devices within and around a facility in order to track positions of various residents and care providers within the facility. Alternatively, Blocks of the method S100 can be executed locally at the wearable device and/or at one or more hubs of the facility.

Furthermore, the method S100 is described herein as implemented within or in conjunction with an assisted-care facility. However, the method S100 can be similarly implemented within a general hospital, a psychiatric hospital, a preschool, a summer camp, or any other institution, clinic, community, etc.

3. Wearable Device

The system includes a resident wearable device configured: to be worn by a resident; and to sample integrated sensors throughout operation at a sampling rate (e.g., 100 Hz). The system can write sensor data from the integrated sensors into a buffer, and to intermittently broadcast an advertisement (e.g., a wireless "beacon" signal) including a data packet containing identification data and sensor data from the buffer at an advertisement rate (e.g., 4 Hz). Hubs throughout the facility can detect these advertisements, and the system can access distance data generated from these advertisements and transform the distance data into locations of wearable devices over time.

In one implementation, the system supports an administrator interface, and an administrator of the assisted living facility (hereinafter "facility") can access the administrator interface to assign a resident of the facility one or more (i.e., a set of) wearable devices. In one example, the administrator may assign a resident two wearable devices, including: a first wearable device to be worn by the resident during the day and recharged and night; and a second wearable device to be worn by the resident at night and recharged during the day. Each wearable device can be loaded with a unique ID (e.g., a UUID), and the unique ID can be associated with a particular resident of the facility, such as in a name mapping server (or "NMS"), as shown in FIGS. 1 and 2.

The wearable device can include: a (three-axis) gyroscope; a (three-axis) accelerometer; a compass; a barometer (e.g., a barometric pressure sensor) and/or an altimeter; a skin temperature sensor; a heart rate sensor; and/or one or more other integrated sensors. The wearable device can also include: a processor; a wireless communication module that broadcasts advertisements and sensor data to local hubs; a memory module that stores sensor data (e.g., data packets) in a buffer of limited duration (e.g., one minute, five minutes); and/or a rechargeable battery that powers the foregoing components. The processor can sample the set of integrated sensors at a single static sampling rate or at different and/or dynamic sampling rates. For example, the processor can sample the gyroscope and accelerometer at a sampling rate of 100 Hz, sample the heart rate sensor once per minute ($1/60$ Hz), and sample the skin temperature sensor and the barometric pressure sensor once per five-minute interval ($1/300$ Hz).

Throughout operation, the wearable device can store data from these sensors in time-stamped data packets. For example, a single data packet can include placeholders for three acceleration values, three gyroscope values, one skin temperature value, one heart rate value, one glucose level value, and one time/data value (i.e., a timestamp), etc., and the wearable device can populate the single data packet with sensor values collected during a sampling period corresponding to the timestamp written to the data packet. However, because the wearable device may sample various integrated and external sensors at different rates, the wearable device can generate a data packet that contains values of fewer than all such integrated and external sensors. Throughout operation, the wearable device can store these data packets in local memory, such as by writing these data packets to a buffer. For example, the buffer can be configured to store a limited number of data packets (e.g., 30,000 data packets), a set of data packets collected over a limited duration of time (e.g., five minutes), or a set of data packets of a limited size (e.g., 100 kilobytes), etc. during a buffer cycle. Throughout operation, the wearable device can pass each new data packet (or sequences of data packets) through the (compressed) fall detection model to identify a fall event substantially in real-time.

The resident wearable device (e.g., a smartwatch or other mobile computing device) can be worn on a wrist, on an ankle, clipped to a belt loop, strapped to a forearm, or worn or carried by the resident in any other way. The system can also include a care provider wearable device. The care provider wearable device can be of a similar form, can include similar sensors, and can execute similar functions as the resident wearable device. An administrator of the facility can similarly access the administrator interface to assign a wearable device to a care provider of the facility. Furthermore, each resident of the facility can be assigned one or more resident wearable devices (e.g., one for daytime use and one for nighttime use), and each care provider employed at the facility can be similarly assigned a care provider wearable device to be worn while on duty at the facility.

However, the system can include any other number of wearable devices of any other form, including any other number or type of sensors, and assigned to residents or care providers in any other way.

4. Hub

The system also includes a hub (e.g., a wireless hub) that functions to bridge communications between a wearable device and the computer system. In one implementation, the hub supports a first wireless communication protocol implemented by the wearable device, supports a second wireless communication protocol implemented by a local Internet-connected wireless router or cellular tower, and routes data between the first and second wireless communication protocols in order to communicate data between the wearable device and the system.

Each hub can be arranged at a known location within the facility, such as at known positions on known walls of known rooms on known floors within the facility as a part of the infrastructure of the facility. The system can define the position of each hub arranged within the facility within a virtual map of the facility. For example, a technician or administrator of the facility can upload a floor plan, blueprint, or three-dimensional model of the facility into the administrator interface or can generate two-dimensional floor plans of the facility within the administrator interface. The technician or administrator can then link an identifier (e.g., a UUID, a serial number) of each hub assigned to the facility to a particular location within the three-dimensional model or within the two-dimensional floor plans, such as after each hub has been installed in the facility and tested. In another example, the system can automatically generate a specification for location of hubs throughout the facility based on two-dimensional floor plans or a three-dimensional model of the facility, such as including the vertical and horizontal position of each hub on a particular wall in a particular room on a particular floor within the facility, and the technician or administrator can manually link a hub to each specified hub location, such as by entering a serial number or other identifier of a hub into each specified hub location shown in the two-dimensional floor plans or in the three-dimensional model of the facility rendered in the administrator portal.

The hub can include a processor and a wireless communication module that receives and/or broadcasts advertisements and sensor data to local wearable devices and/or other hubs. The hub can also include: a barometer and/or an altimeter configured to record pressure and/or vertical position data of the hub. The processor can sample integrated sensors of the hub at a single static sampling rate or at different and/or dynamic sampling rates. Additionally or alternatively, the hub can include a memory module that stores sensor data in a buffer of limited duration; and/or a rechargeable battery that powers the foregoing components. The hub can also include integrated temperature sensors, and/or other integrated sensors.

The system can later locate the intersection of hub-to-wearable device distance values for a wearable device—received from various hubs—within the facility based on real hub locations stored in a virtual map or model of the facility in Blocks S140 and S150 in order to determine the real location of a wearable device in the facility.

5. Hub-Wearable Device Communication

Throughout operation, a resident wearable device can broadcast advertisements of self-contained data packets, and hubs arranged throughout the facility can receive these advertisements and pass these advertisements to the remote computer system, such as via a computer network (e.g., the Internet, an Ethernet). In one implementation, the resident wearable device samples its integrated accelerometer, gyroscope, and compass sensors at a rate of 100 Hz, stores these data in a buffer, and broadcasts a data packet containing sensor data from the buffer at a static advertisement rate of 4 Hz. In this implementation, the resident wearable device can also sample its integrated barometric pressure sensor and append a data packet with a pressure value once per five-minute interval.

Alternatively, the resident wearable device can implement a dynamic advertisement rate. For example, the resident wearable device can implement an onboard activity classifier to transform accelerometer, gyroscope, and/or other motion data collected by sensors in the wearable device into one of various activities of daily living (or "ADLs"), such as one of climbing stairs, descending stairs, drinking, eating, getting out of bed, getting into bed, sitting down, standing up, walking slowly, walking quickly, and running. In this example, the resident wearable device can broadcast an advertisement, including accelerometer, gyroscope, compass, and/or pressure values: at a rate of once per five-minute interval following a "getting into bed" classification or a sitting down classification; at a rate of once per minute following a "getting out of bed," "standing up," or "walking slowly" classification; and at a rate of 1 Hz following a "climbing stairs," "descending stairs," "walking quickly," or "running" classification. Similarly, the resident wearable device can sample its integrated barometric pressure sensor and broadcast an advertisement including a pressure value: at a rate of 1 Hz following a "climbing stairs" or "descending stairs" classification; at a rate of once per minute following "walking quickly" or "running" classifications; and otherwise at a rate of once per five-minute interval. In this example, the wearable device can thus broadcast an advertisement—with a data packet containing sensor data from one or more current and past sampling periods—at a frequency corresponding to a degree of motion or mobility associated with a current action or activity performed by the corresponding resident.

In another example, the resident wearable device can record steps taken by a corresponding resident in a local step counter and can broadcast an advertisement in response to a value in the local step counter exceeding a threshold count (e.g., five steps) since a last broadcast. Similarly, the resident wearable device can implement dead reckoning methods to estimate distances traversed by a resident wearing the resident wearable device and can broadcast an advertisement when the total distance traversed by the resident since a last broadcast exceeds a threshold distance (e.g., five feet).

However, a resident wearable device can broadcast advertisements and sensor data at any other static or dynamic rate throughout its operation.

6. Pressure Data

Blocks S120, S122, and S140 of the method S100 recite: accessing a first pressure value recorded by the first wearable device at approximately the first time and representing a local pressure proximal the first wearable device at approximately the first time in Block S120; accessing a second pressure value recorded by the first hub at approximately the first time and representing a local pressure proximal the first hub at approximately the first time in Block S122; and calculating a vertical position of the first wearable device within the assisted-care facility at approximately the first time based on a difference between the first pressure value and the second pressure value in Block S140. Generally, in Blocks S120, S122, and S140, the system collects and transforms barometric pressure data received from a wearable device and barometric pressure data received from a hub into a measure of altitude of the wearable device within the facility, which the system can then transform into a vertical position (e.g., a floor) occupied by the wearable device.

In one implementation, the system can compare a pressure value recorded by a barometric pressure sensor integrated into a wearable device with pressure values recorded by a barometric pressure sensor integrated into a hub. The system can calculate a vertical offset between the wearable device and the hub based on a difference between the pressure value recorded at the wearable device and a second pressure value recorded at the hub. From the vertical offset, the system can identify the wearable device as occupying a vertical position relative to a (known) vertical position of the hub. Based on the know vertical position of the hub, the system can calculate an absolute vertical position, such as a floor or level of the assisted-care facility occupied by the wearable device. For example, in response to the vertical offset between the hub and the wearable device remaining within a threshold offset (e.g., 100 Pascals), the system can identify the wearable device as occupying a same floor as the hub. However, in response to the vertical offset exceeding the threshold offset and the pressure value recorded at the wearable device exceeding the pressure value recorded at the hub, the system can identify the wearable device as occupying a floor below the floor on which the hub is located.

Additionally or alternatively, the system can generate a barometric pressure map of the facility (or regions of the facility) based on real-time and/or historical pressure data recorded by pressure sensors integrated into wearable devices and/or hubs. For example, at a particular time, the system can sample pressure sensors of all hubs of the facility to generate a barometric pressure map of the facility for that particular time. In another example, the system can access historical pressure data recorded by pressure sensors integrated into hubs of the facility over a prior time window (e.g., a day, a week, or a month). The system can then generate the barometric pressure map of the facility as a linear combination of the pressure data recorded for the prior time window.

The system can compare current pressure values to the barometric pressure map to determine a current vertical position of the wearable device. In particular, the system can compare a pressure value received from a resident wearable device to a barometric pressure map of the facility—extracted from pressure data recorded at wearable devices and hubs—to determine which floor of the facility that a resident assigned to the wearable device currently occupies. For example, the system can access a barometric pressure map defining ranges of pressure values corresponding to each floor of the facility, and the system can match the pressure value received from the wearable device to one barometric pressure range to determine the floor occupied by the resident. In another example, the system: accesses a barometric pressure map defining pressure values for discrete altitude increments in one-foot steps, wherein each altitude increment is associated with a particular floor of the facility; matches the pressure value received from the wearable device to the barometric pressure range of one altitude increment to determine the altitude of the resident wearable device; and determines the resident wearable device to be occupying the corresponding floor of the facility.

However, the system can also compare the pressure value recorded by the barometric pressure sensor integrated into the wearable device with pressure values recorded by other devices at known locations within the facility to extrapolate an absolute vertical position of the wearable device within the facility in any other suitable way.

6.1 Calibration & Validation

Block S124 of the method recites accessing pressure data recorded by wearable devices at known locations within the assisted-care facility in Block S124. Generally, the system can access pressure data from any wearable device and/or hub at a known location within the facility to generate a barometric pressure map representing pressures at discrete locations of the facility at the current time and/or as a function of historical pressure data averaged over time.

The system can calibrate the barometric pressure map over time. In one implementation, hubs arranged throughout the facility include barometric pressure sensors—similar to barometric pressure sensors arranged in the resident and care provider wearable devices—and intermittently upload pressure values to the system. In this implementation, the system can calculate an average barometric pressure (and/or barometric pressure range) in each floor of the facility based on pressure values received from hubs of known locations within the facility, such as real known hub positions in known rooms on known floors defined in a model of the facility as described above. The system can then generate a range of pressure values for a floor of the facility based on the average barometric pressure calculated for the floor, such as based on a barometric pressure range for the floor of known ceiling height and centered at the average barometric pressure calculated for the floor. Alternatively, the system can implement similar techniques to calculate an average barometric pressure for each of multiple distinct sectors within each floor of the facility, for each of multiple distinct rooms on each floor of the facility, etc. and can calculate a pressure range for each sector or for each room on each floor of the facility. The system can then populate or update the barometric pressure map for the facility with these barometric pressure data.

In one variation of the method S100, the system occasionally (e.g., once per hour) issues a prompt to a care provider wearable device—via hubs arranged throughout the facility—for the care provider to manually enter which floor, floor section, or room, etc. she is currently occupying. In this implementation, the care provider wearable device regularly samples its integrated barometric pressure sensor and uploads pressure values to the system, such as once per five-minute interval, via the hub. In response to receipt of a new pressure value from the care provider's wearable device, the system can automatically return a prompt to the care provider wearable device—or to a smartphone or other mobile computing device assigned to the same care provider—for manual entry of the number of the floor or stairwell she is currently occupying. Upon receipt of a response from the care provider wearable device or affiliated mobile computing device, the system pairs the last pressure value received from the care provider wearable device with the floor number and revises the barometric pressure map of the facility to reflect these new data.

In one implementation, the care provider wearable device samples its integrated barometric pressure sensor and uploads a pressure value to the system via a local hub. Upon receipt of a pressure value from the care provider wearable device, the system can implement methods and techniques described below to determine the care provider's current location (e.g., floor, floor section, room, or (X, Y, Z) coordinate) within the facility, such as according to methods and techniques described below. The system can then populate or recalibrate the barometric pressure map for the facility based on the pressure value received from—and the determined location of—the care provider wearable device. Furthermore, if a confidence score for the determined location of the care provider is less than a threshold confidence, the system can: return a prompt to the care provider wearable device—via a hub near the care provider wearable device— to manually confirm the care provider's current location; adjust the determined location of the care provider based on feedback received from the care provider through her wearable device; and (only) then populate or recalibrate the barometric pressure map for the facility based on the pressure value received from the corrected location of the care provider wearable device.

In another variation, the system: collects barometric pressure data from a group of (e.g., all) wearable devices of residents and/or care providers within the facility; correlates each of these pressure values with an altitude to generate a height map of wearable devices within the facility; and transforms the height map into a set of altitude bands based on clusters of wearable devices represented in the height map and a number of floors of the facility, wherein each band corresponds to a single floor within the facility. In this implementation, the system can then update the barometric pressure map, a lookup table, or another barometric pressure database with maximum and minimum pressure values contained in each band. For a next pressure value received from a resident wearable device, the system can compare this new pressure value to the range of pressure values thus stored for each floor in the facility to determine which floor the corresponding resident is currently occupying.

The system can regularly repeat any of the foregoing calibration processes in order to recalibrate the barometric pressure map to account for HVAC activity, opening of interior and exterior doors, and/or environmental changes, etc. that may affect barometric pressures throughout the facility. For example, once per hour, the system can broadcast—through hubs distributed throughout the facility—a trigger for all resident and care provider wearable devices to sample their integrated barometric pressure sensors and to return a pressure value to the system. The system can then implement the foregoing methods and techniques to update a barometric pressure map or barometric pressure lookup table, etc. for each floor, floor section, or room in the facility based on these barometric pressure data pulled from wearable devices within the facility. In another example, the resident and care provider wearable devices regularly push barometric pressure data to the system (e.g., once per five-minute interval) throughout their operation; and the system stores a last pressure value received from each wearable device in a buffer and executes a calibration routine with the pressure values stored in the buffer on a regular interval (e.g., once per thirty-minute interval) or once the buffer is filled with barometric pressure data from a threshold number of (e.g., 300) wearable devices.

However, the system can implement any other methods or techniques to recalibrate a barometric pressure map of the facility.

7. Hub-to-Wearable Device Distance

Block Silo of the method S100 recites: accessing a first distance value representing a distance from a first hub arranged within the assisted-care facility to a first wearable device based on a first wireless signal transmitted between the first wearable device and the first hub at a first time. Generally, the system can collect hub-to-wearable device distance values—for various wearable devices throughout the facility—from hubs arranged within the facility. The system can therefore interface with a single hub or multiple hubs, each of which passes a value corresponding to a distance from itself to a wearable device within wireless range to the system.

In one implementation shown in FIG. 1, a hub records a received signal strength indication (RSSI) of an advertisement broadcast by a wearable device, transforms the RSSI value into a hub-to-wearable device distance value based on a known transmit power of the wearable device (as described below), links the hub-to-wearable device distance value to an identifier (e.g., a UUID) of the wearable device received in the advertisement, and passes the hub-to-wearable device distance value and the UUID to the system. Alternatively, in this implementation, the hub can pass the RSSI value and UUID to the system, and the system can transform the RSSI value into a hub-to-wearable device distance value and/or a sequence of distance values based on a known transmit power of the wearable device.

In this implementation, each wearable device can broadcast advertisements at a preset (i.e., static) transmit power known by hubs arranged throughout the facility and/or by the system, which can calculate a hub-to-wearable device distance value based on this transmit power. Alternatively, a wearable device can vary its transmit power over time. In one implementation, when broadcasting an advertisement, a wearable device automatically steps up its transmit power from a minimum transmit power until a response to the advertisement is received from at least a threshold number of (e.g., three) hubs. Each of these three or more hubs can then generate a hub-to-wearable device distance value (e.g., an RSSI value) for the wearable device based on: a strength of the advertisement signal received at the hub; and transmit power specified in a data packet contained within the advertisement received from the wearable device. The hubs can then pass these hub-to-wearable device distance values to the system, which can transform these hub-to-wearable device distance values into a location of the wearable device within the facility.

Similarly, in response to receipt of fewer than a threshold number of hub-to-wearable device distance values specifying a particular wearable device within a threshold period of time (e.g., one or two wearable device advertising intervals), the system can transmit a prompt to the particular wearable device—via hubs arranged throughout the facility—to increase its transmit power in order that hubs within the facility can receive advertisements from the particular wearable device and in order that the system can determine the location of the particular wearable device with greater confidence and/or less error. For example, the system can prompt the particular wearable device to increase its transmit power from a lower transmit power to a high transmit. In another example, the system can prompt the particular wearable device to step up its output power, and the system can repeat this process until the threshold number of hub-to-wearable device distance values specifying the particular wearable device are received within the threshold period of time. Similarly, if more than the threshold number of hub-to-wearable device distance values for the particular wearable device are received within the threshold period of time, the system can send a prompt to the particular wearable device—via local hubs—to reduce its transmit power in order to reduce power consumption by the particular wearable device. In this implementation, the system can thus monitor received hub-to-wearable device distance values for all (or a subset of) wearable devices issued to residents and care providers throughout the facility, and the system can actively prompt wearable devices to increase and decrease their transmit power in order to reduce location errors and to reduce wearable device power consumption, respectively. The system can implement similar methods to actively determine if a wearable device is out of range of all hubs within the facility, which may indicate that a wearable device is disabled or that a resident or care provider wearing the wearable device has left the facility.

In another implementation, the hub includes an integrated high-frequency granular clock and implements time-of-flight techniques to calculate a hub-to-wearable device distance value for a wearable device in response to receipt of an advertisement from the wearable device. In this implementation, in response to receipt of an advertisement from a wearable device, the hub broadcasts a transmit value to the wearable device, stores a transmit time at which the transmit value was broadcast, receives a return value—related to the transmit value—from the wearable device, and stores a receive time at which the return value was received from the wearable device. The hub (or the system) can then approximate a distance between the hub and the wearable device based on a difference between the transmit time and the return time based on various known processing speeds of the hub and/or the wearable device, etc.

However, the system can implement any other method or technique, such as beamforming, spatial filtering, phase differences, directional signal transmission, etc., to transform characteristics of a wireless signal into a distance values representing distances between a device that transmits the wireless signal to a device that receives the wireless signal within the facility—from which the system can calculate locations of a wearable device.

8. Wearable Device Location

Block S150 of the method S100 recites calculating a location within the assisted-care facility occupied by the first wearable device at approximately the first time based on the first distance value and the vertical position occupied by the first wearable device at approximately the first time. Generally, in Block S150, the system transforms hub-to-wearable device distance values corresponding to a particular wearable device—received from various hubs within the facility over a limited period of time—into an approximate location of the wearable device within the facility. Then the system confirms the approximated location of the wearable device based on the vertical position of the wearable device calculated from pressure data in Block S140, as described above. Therefore, the system can transform a single (non-directional) distance value representing a distance between one hub and a wearable device into a directional vector (i.e., from the hub to the wearable device) pointing to location occupied by the wearable device.

In one implementation, the system can average hub-to-wearable device distance values received from a particular hub and for a particular wearable device over a limited period of time (e.g., ten seconds). Alternatively, the system can average a preset number of (e.g., five) hub-to-wearable device distance values received from the particular hub, the hub-to-wearable device distance values representing a distance between the particular hub and the particular wearable device. The system can then store this composite hub-to-wearable device distance value, which may in cooperation with pressure data reduce errors from variability in calculated distance with RSSI, time-of-flight, or other wireless distance methods. The system can repeat this process for each wearable device and hub represented in hub-to-wearable device distance values collected from hubs throughout the facility over a limited period of time (e.g., the last ten seconds, the last five sampling periods).

The system can also implement triangulation techniques to transform composite hub-to-wearable device distance values originating from multiple hubs and associated with a particular wearable device into a location of the particular wearable device within the facility at the current time based on known locations of each hub in the facility. For example, the system can access a name mapping system linking UUIDs of each hub in the facility to a particular position of the hub on a particular wall in a particular room on a particular floor of the facility. The system can then: generate a virtual sphere (or virtual volume) for a composite hub-to-wearable device distance value for a particular wearable device, wherein the virtual sphere has a virtual spherical radius equal to its composite hub-to-wearable device distance value, as shown in FIG. 1; plot the virtual sphere within a virtual three-dimensional space representing the facility based on the known location of the hub from which the composite hub-to-wearable device distance value originated; and repeat this process for each other composite hub-to-wearable device distance value associated with the particular wearable device. In this example, if two virtual spheres representing locations of the particular wearable device relative to two hubs exist in the virtual three-dimensional space, the system can record the two intersections of the two virtual spheres as the two possible current locations of the particular wearable device. If three virtual spheres representing locations of the particular wearable device relative to three hubs exist in the virtual three-dimensional space, the system can record the one intersection of the three virtual spheres as the current location of the particular wearable device. However, if four or more virtual spheres representing locations of the particular wearable device relative to four or more hubs exist in the virtual three-dimensional space, the system can calculate a three-dimensional average (or centroid) of all intersections within the set of virtual spheres and store this value as the current location of the particular wearable device. The system can repeat this process for each other wearable device represented in hub-to-wearable device distance values collected in a last scan cycle in order to determine the current location of all residents (and care providers) in the facility.

In a similar implementation, the system can populate a virtual three-dimensional space with a set of virtual spheres, wherein each virtual sphere has a spherical radius equal to an original hub-to-wearable device distance value received from a hub and corresponding to a particular wearable device, and wherein each virtual sphere is located within the three-dimensional space according to the real position of its corresponding hub. In this implementation, the set of virtual spheres can represent original hub-to-wearable device distance values received from multiple hubs over a period of time (e.g., three seconds, or a period over which ten data packets are received from the particular wearable device) and corresponding exclusively to the particular wearable device. The system can then implement methods and techniques as described above to average or otherwise compile three-dimensional locations of intersections between these virtual spheres within the virtual three-dimensional space to estimate the real current location of the particular wearable device. The system can then repeat this process for each other wearable device represented in hub-to-wearable device distance values collected over the same period of time in order to determine the current location of all residents (and care providers) in the facility.

The system can also transform a pressure value received from the particular wearable device into a vertical position of the particular wearable device on a particular floor of the facility and can implement this particular vertical position of the particular wearable device as an additional data point when transforming composite hub-to-wearable device distance values associated with the particular wearable device into a location of the wearable device within the facility. For example, if the system identifies no solution to map four composite hub-to-wearable device distance values for a particular wearable from the locations of their corresponding hubs to a common junction point in three-dimensional space, the system can calculate a location in three-dimensional space that best fits the four composite hub-to-wearable device distance values at a common junction aligned with a vertical position of the particular wearable device—determined from the most-recent pressure value received from the particular wearable device.

However, the system can calculate an approximated location of the wearable device relative to hubs and/or infrastructure of the facility in any other suitable way.

8.1 Location+Pressure

The system can then confirm the determined location of the wearable device within the facility based on the vertical position of the facility occupied by the resident. Generally, the system compares a location of a wearable device calculated based on distance values to a vertical position calculated based on pressure data collected from the wearable device to confirm the approximated location of the wearable device.

In one implementation, if the three-dimensional location (e.g., floor and (X,Y) or (X,Y,Z) position on a floor) of a wearable device does not match the floor indicated by barometric pressure data received from the wearable device, the system can: discard the approximated location of the wearable device; calculate a reduced confidence score for the approximated location of the wearable device, and/or identify and discard outliers in hub-to-wearable device distance values from which the approximated location was calculated and implement methods described above to recalculate the location of the wearable device based on remaining hub-to-wearable device distance values.

The system can additionally or alternatively merge barometric pressure data from a wearable device with hub-to-wearable device distance values for the wearable device to determine the location of the wearable device within the facility. In one implementation, if hub-to-wearable device distance values for a particular wearable device are available from hubs spanning multiple floors of the facility, the system can remove available hub-to-wearable device distance values originating from hubs on other than the floor occupied by the wearable device. For example, if hub-to-wearable device distance values originating from a threshold number of (e.g., at least three) hubs positioned on the same floor as the wearable device are currently available, the system can implement methods and techniques described above to transform only a subset of available hub-to-wearable device distance values originating from hubs on the same floor as the wearable device into an estimated location of the wearable device within the facility.

In another implementation, the system generates an initial prediction of the location of the wearable device within the facility based on the floor currently occupied by the wearable device, based on which hubs are currently in wireless range of the wearable device, and/or based on hub-to-wearable device distance values for the wearable device. In this example, the system can then select a subset of hub-towearable device distance values originating from the three (or other target number of) hubs for which the lowest attenuation by the facility structure is indicated in a wireless signal attenuation map for the facility given the initial predicted location of the wearable device. For example, when determining a location of a particular wearable device, the system can discard hub-to-wearable device distance values received from a hub partitioned from the particular wearable device by a concrete or plaster wall and instead determine the location of the particular wearable device from hub-to-wearable device distance values received from hubs above and below the particular wearable device and partitioned from the wearable device by drywall, insulation, wood subfloor, and/or carpet, which may attenuate a wireless signal transmitted by the wearable device less than concrete and plaster. The system can implement the foregoing methods and techniques to recalculate the current location of the wearable device based on this subset of hub-to-wearable device distance values.

Once the location of a particular wearable device within the facility is thus determined, the system can write this location—and a timestamp for the corresponding period of time—to a location history database of the resident assigned to the particular wearable device. The system can repeat this process for all other wearable devices assigned to residents and care providers within the facility in order to populate and maintain resident-specific and care provider-specific location history databases over time, wherein each location history database represents a time series of locations occupied by a corresponding resident or care provider over time.

The system can record the location of the wearable device within coordinates representing a latitude, a longitude, an altitude of the wearable device relative to a particular hub arranged in the facility and calculated based on a combination of the vertical offset between the hub and the wearable device as described above and the distance value representing the distance between the hub and the wearable device. Additionally, the system can transform the latitude, the longitude, the altitude of the wearable device relative to a particular hub arranged in the facility into an absolute coordinate representing an absolute latitude, an absolute longitude, an absolute altitude of the first wearable device relative to the assisted-care facility based on a known location of the hub within the assisted-care facility.

8.2 Examples

As described above, the system can access distance values between the wearable device and any number of hubs at various locations within the facility. In one example, the system can access characteristics of wireless signals representing distances between the wearable device and multiples hubs on a same floor as the wearable device as shown in FIG. 2. In this example, to calculate a vertical position of the wearable device, the system can access pressure values recorded by the wearable device and pressure values recorded by the first hub. In response to the pressure values recorded by the wearable device falling within a threshold range of the pressure values recorded by the first hub, the system can identify the first wearable device as occupying the same floor of the assisted-care facility as the first hub and the second hub at approximately the first time. Additionally, the system can calculate a vertical offset between the wearable device and the first hub based on a difference between pressure values recorded by the wearable device and the first hub.

In the foregoing example, to calculate the (absolute) location within the assisted-care facility occupied by the wearable device, the system can: access a characteristic of a first wireless signal representing a first distance from a first hub to the wearable device; and access a characteristic of a second wireless signal representing a second distance from a second hub, offset from the first hub and on the same floor as the first hub in the assisted-care facility, to the wearable device. The system can then estimate a volume of possible locations of the wearable device within the facility by: calculating a first spherical volume within a radius of the first distance and centered at a known (absolute or relative) position of the first hub; calculating a second spherical volume within a radius of the second distance and centered at a known (absolute or relative) position of the second hub; calculating a slice (e.g., plane or planar window) corresponding to the calculated altitude of the wearable device (relative to an absolute reference or to the first hub); calculating a union of the first volume, the second volume, and the slice; and storing the union (or a centroid of the union, etc.) as a likely location of the resident.

Additionally, the system can access a characteristic of a third wireless signal representing a third distance from a third hub—on a same floor of the assisted-care facility as the first hub and the second hub—to the wearable device as shown in FIG. 2. The system can then calculate a third spherical volume with a radius of the third distance and centered at a known (absolute or relative) position of the third hub. As described above, the system can calculate a union of the first volume, the second volume, and the third volume; and storing the union (or a centroid of the union, etc.) as a likely location of the resident. Therefore, the system can triangulate a latitude, a longitude, and an altitude of the wearable device within the assisted-care facility—corresponding to an intersection between the first wireless signal, the second wireless signal, and the third wireless signal—without pressure data. The system can then: calculate a slice (e.g., plane or planar window) corresponding to the calculated altitude of the wearable device (relative to an absolute reference or to the first hub); and confirm the altitude of the wearable device in the facility in response to the first pressure value falling within a threshold range of the pressure values recorded at the first hub, pressure values recorded at the second hub, and pressure values recorded at the third hub.

Generally, in response to communication of wireless signals between three (or more) hubs and the wearable device, the system can triangulate a likely location of the wearable device within the facility within a reasonable margin of error as described above. When confidence in the calculated locations is high (e.g., when three or more hubs communicate with the wearable device), the system can correlate pressure values with particular locations and/or floors of the assisted-care facility and, from accurately mapped pressure data, predict pressures nearby where fewer than three hubs communicate with the wearable device.

However, when two or fewer hubs communicate wireless signals to the wearable device, the system can merely isolate a volume of possible locations of the wearable device to the intersection between the first wireless signal and the second wireless signal with a high margin (or tolerance) of error. To improve accuracy and reduce error, the system can calculate a vertical position of the wearable device based on pressure data; restrict the volume of possible locations to the slice (e.g., plane or planar window) corresponding to the calculated vertical position of the wearable device; and isolate the likely location of the wearable device within the facility. Therefore, the system can employ pressure data to calculate accurate locations of the wearable device within the facility while reducing a quantity of hubs necessary to calculate accurate locations of wearable devices within the facility. With fewer hubs, administrators of the assisted-care facility can avoid infrastructure changes (e.g., power source, internet or Ethernet access) necessary for the hubs to function and costs associated with supporting hubs.

Alternatively, the system can access characteristics of wireless signals representing distances between the wearable device and multiples hubs on a different floor from the wearable device. For example, the system can: access a characteristic of a first wireless signal representing a first distance from a first hub to the wearable device; and access a characteristic of a second wireless signal representing a second distance from a second hub—on a different floor from the first hub—to the wearable device. To calculate a vertical position of the wearable device, the system can access pressure values recorded by the wearable device and pressure values recorded by the first hub. In response to a difference between the pressure values recorded by the wearable device and pressure values recorded by the second hub exceeding a difference between the pressure values recorded by the wearable device and pressure values recorded by the first hub, the system can identify the first wearable device as occupying the same floor of the assisted-care facility as the first hub (and a different floor from the second hub) at approximately the first time. To calculate the (absolute) location within the assisted-care facility occupied by the wearable device, the system can estimate a volume of possible locations of the wearable device based on the first distance value while rejecting the second distance value as irrelevant to calculating the latitudinal and longitudinal positions of the wearable device. Because the second wireless signal traverses a floor of the facility to reach the wearable device, the second distance value accessed by the system may be inaccurate or skewed due to attenuation or other interruption. Therefore, the system can reject or omit the second distance value from the location calculation. As described above, the system can then estimate a volume of possible locations of the wearable device within the facility by: calculating a first spherical volume with a radius of the first distance and centered at a known (absolute or relative) position of the first hub; calculating a slice (e.g., plane or planar window) corresponding to the calculated altitude of the wearable device (relative to an absolute reference or to the first hub); calculating a union of the first volume, and the slice; and storing the union (or a centroid of the union, etc.) as a likely location of the resident.

8.3 Crowdsourcing Pressure Data

As shown in FIG. 3, one variation of the method S100 includes: accessing pressure data recorded by wearable devices at known locations within the assisted-care facility in Block S124; correlating the pressure data with known locations within the assisted-care facility to generate a map of pressure data at various locations within the assisted-care facility in Block S142; and estimating a first location of the first wearable device within the assisted-care facility at approximately the first time based on alignment between the first pressure value and pressure data represented in the map in Block S152. Generally, in this variation, the system can estimate horizontal locations of wearable devices within the facility based on a map of pressure data collected by devices (e.g., hubs and/or wearable devices) at known locations of the facility.

In particular, the system can access pressure data recorded by wearable devices assigned to residents and/or care providers at known locations within the assisted-care facility. The system can then correlate the pressure data with the known locations to generate a map of pressure data at various locations within the assisted-care facility. From the map, the system can estimate the location (i.e., latitude, longitude, and altitude) of a wearable device within the assisted-care facility based on alignment between a pressure value recorded by the wearable device and pressure data represented in the map. For example, the system can access a pressure value (e.g., 101,325.4 Pascals) recorded by pressure sensors integrated into a resident wearable device. The system can compare the pressure value to historical pressure data in a map of the facility, which defines ranges of expected pressures for each room, each region, and/or each floor of the facility. On a first floor of the facility, the system can expect to detect pressure values between 101,328 Pascals and 101,326 Pascals, as defined in the map. On a second floor of the facility above the first floor, the system can expect to detect pressure values between 101,326 and 101,323 Pascals, as defined in the map. In a first room on the second floor, the system can detect historical pressure data—compiled to generate the map—indicates pressures values around 101,325.4 Pascals and therefore expect to see pressures recorded by wearable devices within the first room on the second floor around 101,325.4 Pascals. In a second room on the second floor, the system can detect historical pressure data—compiled to generate the map—indicates pressures values around 101,325.2 Pascals. Therefore, based on the pressure value recorded by pressure sensors in the wearable device, the system can isolate the wearable device to the first room on the second floor.

Thus, the system can apply historical pressure data—as represented in a pressure map of the facility—to estimate latitudinal and longitudinal locations of wearable devices within the facility. The system can then apply distance values representing distances between the wearable device and hubs of the facility to confirm the estimated location of the wearable device within the facility.

8.4 Vertical Orientation

Figure 4:
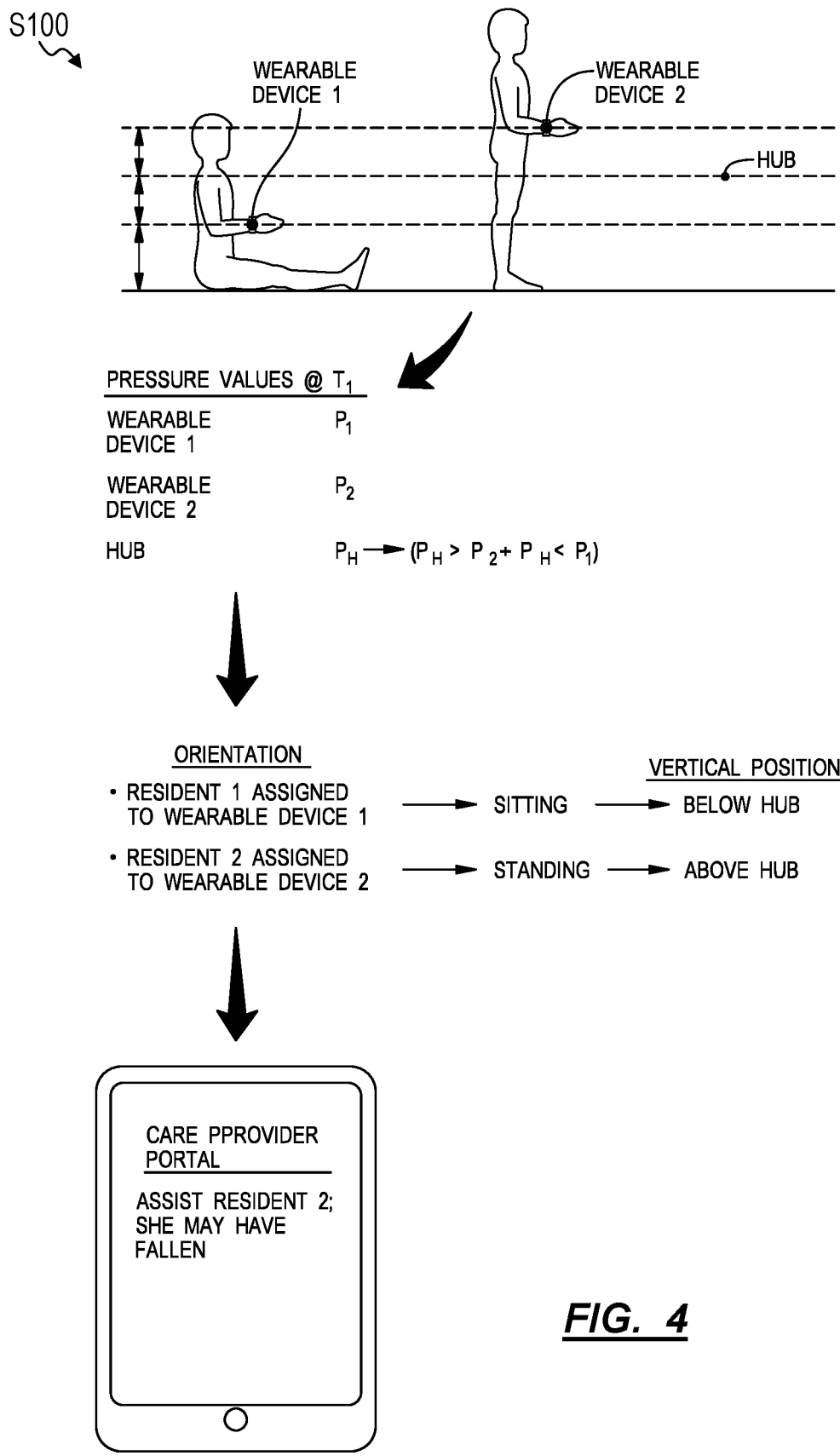
FIG. 4 is a flowchart representation of a variation of the method.

As shown in FIG. 4, the system can access pressure values recorded by a wearable device assigned to a resident to determine an orientation (e.g., supine or standing) of the resident within the assisted-care facility. Generally, the system can determine the orientation of the residents by comparing pressure data recorded by the wearable device to pressure data recorded by hubs—at known heights on a floor of the facility—to determine a vertical offset between the hub and the resident wearable device. Based on the vertical offset, the system can determine whether the resident wearable device is above or below the hub and determine whether a patient is supine (e.g., has fallen to the floor) or is standing. Based on the known orientation of the resident, the system can selectively dispatch care providers to the resident's location to assist the resident, such as when the resident is supine and may require assistance to return to her feet.

For example, the system can access a known vertical position of a first hub within the assisted-care facility (e.g., from a map of the assisted-care facility or from data). Additionally, the system can access a known vertical position of the second hub within the assisted-care facility above the known vertical position of the first hub. In response to a first pressure value recorded by pressure sensors in the wearable device exceeding a second pressure value recorded by pressure sensors in the first hub (or an expected pressure calculated for a wearable device worn by a resident standing on the same floor as the first hub), the system can calculate an orientation (e.g., horizontal, vertical, or skew) of the first wearable device at approximately the first time as below the known vertical position of the first hub. In response to the first pressure value remaining within a range of pressures corresponding to pressures expected for the floor on which the first hub is arranged, the system can also calculate a vertical position of the first wearable device within a same floor of the assisted-care facility as the first hub. However, in response to the first pressure value falling below the second pressure value and remaining within the range of pressures: the system can calculate the orientation of the first wearable device at approximately the first time as above the known vertical position of the first hub; and calculate a vertical position of the first wearable device within a same floor of the assisted-care facility as the first hub. The system can then record the orientation along with the vertical position of the wearable device in the database. The system can also notify a care provider to assist the resident assigned the first wearable device in response to the orientation of the first wearable device falling below the known vertical position of the first hub as the resident may be on the floor and require assistance.

9. Outputs

Block S160 of the method S100 recites recording the location, a timestamp for the first time, and a first identifier assigned to the first wearable device to a database. Generally, the system can record or otherwise store locations of wearable devices within the assisted-care facility and times at which the wearable device occupied those locations within a database and/or remote server.

9.1 Breadcrumbs

The system can store a determined location of a resident or care provider wearable device in a location history database corresponding to the resident or care provider, and the system can execute similar methods and techniques for all other residents and care providers throughout the facility. The system can thus implement these resident and care provider location history databases to: identify a location of a resident at the time of a fall event, breach event (i.e., when a resident leaves a designated area of the facility), or any other alarm or emergency event; identify one or more care providers near the resident's location at the time of the alarm or emergency event; and dispatch nearest care providers to the resident's location to aid the resident.

The system can log each location, corresponding to a timestamp for each location data point, and the first wearable device identifier within a temporal map (i.e., a "heatmap") representing a particular resident's locations in the assisted-care facility over a time window. The system can weight recent locations (i.e., locations with corresponding timestamps near a current time) more heavily than locations occupied by residents in the assisted-care facility less recently in the temporal map. The system can serve the temporal map to a computing device (e.g., a smartphone and/or computer system) affiliated with a care provider of residents within the assisted-care facility, such that a care provider may access both a location currently occupied by a resident as well as past locations occupied by the resident. The system can also log locations and times of fall events and/or other incidents within the assisted-care facility (e.g., perimeter breach events) within the temporal map. The system can then extract trends in locations, times, and frequency of incidents within the assisted-care facility and by the resident; and preemptively assist residents to avoid future incidents. For example, the system can serve a work-order to the care provider to respond to and assist a resident at a location in which the resident has fallen in the past.

Furthermore, the system can generate a map for each resident (and/or all residents) within the facility to the care provider portal to inform the care provider where each resident currently is located; locations (e.g., geospatial locations, regions, areas, room, etc. of the facility or surrounding areas) occupied by the resident at instances in time in the past; and predict locations occupied by the resident at future instances in time. Based on the map, the system can identify a particular resident with decreased mobility patterns (or downwardly-trending mobility patterns). Thus, the system can identify variation in behaviors of each resident to efficiently identify when a particular resident may be depressed, may be less mobile, and when a particular resident is at higher risk for an incident based on changes in the resident's mobility over time. For example, the system can determine—from location data collected over a period of two months—that a first resident visits rooms of a second resident and a third resident on a daily basis. However, the system can determine that the first resident has visited the second resident's room but not the third resident's room and that the resident has not met the third resident elsewhere in the facility during these past four days based on a map representing the first resident's locations during these past four days. Accordingly, the system can flag the change in the first resident's social behaviors and notify a care provider in the facility that the first resident may have had a disagreement with the third resident, may be experiencing increased depression or anxiety, may be ill, and/or may be experiencing decreased mobility and therefore not visiting the third resident's room. Therefore, the system can prompt the care provider and/or a family member to monitor the first resident more closely or check-in with the first resident to determine if she requires additional medical attention. Additionally or alternatively, the system can prompt family members, friends, and/or other visitors to visit or check-in with the first resident.

9.2 Fall Events

As described in U.S. patent application Ser. No. 15/339,771, which is herein incorporated in its entirety by this reference, in response to detecting an incident, such as a fall event, the resident's wearable device can broadcast a test signal to one or more local wireless communication hubs of known location(s) within the facility. The system can: identify the location of the wearable device based on known locations of local wireless hubs that recently received location beacons from the wearable device, as described above; identify the resident assigned to the wearable device; then dispatch a care provider to the location of the wearable device, as shown in FIGS. 1 and 3, to assist. For example, upon confirmation of the fall event, the system can pass the UUID of the wearable device into a name mapping system to retrieve a resident ID—such as including a name, a health status, a current health condition, and/or a most-current photographic image, etc. of the resident—assigned to the wearable device.

The system can then: aggregate these data into a fall response prompt indicating that a resident has fallen, specifying a last known location of the resident, and indicating various resident data (e.g., the resident's name, age, gender, known medical complications, etc.); and distribute this fall response prompt to care providers in the facility in Block S170, as described in U.S. patent application Ser. No. 15/339,771. For example, care provider computing devices issued to care providers throughout the facility can regularly broadcast location beacons readable by local wireless hubs arranged at known locations throughout the facility, and the system can implement methods and techniques described above to track locations of care providers throughout the facility based on known locations of local wireless hubs that received these location beacons from these care provider computing devices. In this example, the system can selectively transmit the fall response prompt: to a single care provider computing device nearest the last recorded location of the resident's wearable device; to a set of care provider wearable devices within a threshold distance (e.g., within 100 feet) of the last recorded location of the resident's wearable device; or to a set of care provider wearable devices occupying the same room, the same floor, the same building, or the same outdoor space as the resident's wearable device.

In the foregoing implementation, the system can distribute a fall response prompt to a care provider in the facility in the form of a text message, a push notification within a native application or web browser executing on the care provider's computing device, or in any other format, as shown in FIG. 3. The fall response prompt can also include a prompt to confirm or discard the fall response prompt. For example, if a first care provider to receive the fall response prompt discards the fall response prompt via her assigned computing device, the system can serve the fall response prompt to a computing device of a next care provider and repeat this process until a care provider confirms through her assigned computing device that she will assist the resident. Once a care provider confirms that she will respond to the fall event, once a calculated location of the care provider's computing device falls within a threshold distance of the last known location of the resident's wearable device, or once a wireless connection or physical contact between the care provider's computing device and the resident's wearable device indicate that the care provider is present at the resident's location, the system can serve an incident report to the care provider's computing device or enable access to the incident report through a care provider portal affiliated with the care provider. For example, the system can automatically populate the incident report with: resident information (e.g., name, age, gender, etc.); responding care provider information (e.g., name, employee ID); duration of time from detection of the fall event to arrival of the responding care provider to the resident's location; a type of the incident (e.g., a fall); etc. The system can also: interpret a magnitude of the fall event from sensor data received from the resident's wearable device, such as based on a rate of change in altitude of the wearable device during the fall event and/or by extracting a magnitude of the resident's impact with the ground based on acceleration values recorded by the wearable device during the fall event; and automatically write this magnitude of the fall event to the incident report.

Therefore, upon dispatching a care provider to assist the resident, the system can: access a digital incident report; insert a name of the resident, affiliated with the wearable device, into the digital incident report; insert a prompt to verify the fall event into the digital incident report; and transmit the digital incident report to a computing device affiliated with the care provider. The care provider can then manually complete remaining elements in the incident report during or after assisting the resident. For example, the care provider can manually enter confirmation that the resident was involved in a fall event, an apparent magnitude of the fall event, apparent injuries sustained by the resident during the fall event, etc. into the incident report through her computing device. The system can then: automatically label the corpus of sensor data—received from the wearable device responsive to the detected fall event—with confirmation or rejection of the fall event entered into the incident report by the care provider; and retrain the compressed and complete (and intermediate) fall detection models based on these new labeled data.

9.3 Care Provider Portal

Additionally or alternatively, the system can cooperate with a user portal—rendered on a display of a computing device—to provide care providers, family members, and/or other interested parties with (real-time) resident location data. For example, a care provider may request—through a user portal rendering on a computing device affiliated with the care provider—a current location of a particular resident of the facility in order to serve the resident time-sensitive medication, inform the resident of visitors, etc. The user portal can then query the system for a current location of the particular resident and can return the current location within a window of the user portal. Therefore, a care provider and/or other interested party can quickly access each resident's location substantially in real-time, such as when a visitor is present or the resident needs medication.

10. Fingerprinting

In one variation, the system: generates "fingerprints" of select locations throughout the facility based on hub-to-wearable device distance values for care provider and/or technician wearable devices and corresponding location feedback received from care providers and/or a technician; and matches hub-to-wearable device distance values for a resident wearable device to one or more "fingerprints" to determine the location of the resident wearable device.

In one implementation, the system interfaces with a technician portal to receive an architectural floor plan of the facility and locations of hubs arranged throughout the facility, such as entered manually by a technician. The system then executes a fingerprinting routine by: automatically generating a set of waypoints within the facility, such as one waypoint centered in each room or one waypoint centered in each 500-square-foot rectilinear area; dispatching the technician to each waypoint; and, for each waypoint, recording hub-to-wearable device distance values for a wearable device worn by the technician in response to manual confirmation by the technician—such as through the technician wearable device or through a smartphone or other mobile computing device carried by the technician—that the technician is standing at a waypoint. The system can then compile these hub-to-wearable device distance values into a composite (e.g., average) hub-to-wearable device distance value for each hub within wireless range of each waypoint, and the system can store each set of hub-to-wearable device distance values corresponding to one waypoint as a "fingerprint" for this waypoint.

The system can additionally or alternatively dispatch care providers to select waypoints within the facility over time, the system can generate a new fingerprint or update an existing fingerprint for a waypoint based on hub-to-wearable device distance values received from hubs near the waypoint following confirmation from the care provider—such as through the care provider wearable device or through a smartphone or other mobile computing device carried by the care provider—that the care provider has positioned herself at the designated waypoint. For example, when a care provider wearable device is detected near a waypoint, such as according to methods and techniques described above, the system can transmit a notification to the care provider wearable device prompting the care provider to walk to a particular location corresponding to the nearby waypoint; once the care provider confirms through her wearable device, smartphone, or other device that she is standing at the designated waypoint, the system can collect hub-towearable device distance values output from hubs near the waypoint, update a fingerprint or calculate a new fingerprint for this waypoint based on these new hub-to-wearable device distance values, and then store the updated or new fingerprint in a lookup table or other fingerprint database.

In the foregoing implementation, the system can regularly dispatch care providers to waypoints in a static list of waypoints over time, such as to accommodate for local changes in wireless signal attenuation—which may affect RSSI- or time-of-flight-based hub-to-wearable device distance values—due to occupancy changes, number of local wireless-enabled devices, furnishing changes, interior finish (e.g., wall paint, carpet) changes, or repositioned hubs, etc. The system can additionally or alternatively define additional waypoints over time, can dispatch care providers to these new waypoints, can generate fingerprints for these new waypoints based on hub-to-wearable device distance values received from care providers' wearable devices, and can populate the lookup table or other fingerprint database with these new fingerprints.

Alternatively, a care provider wearable device or a mobile computing device assigned to a care provider can occasionally prompt the care provider to enter her current location, such as by selecting her current location on a two-dimensional map of the facility once per hour. The system can: collect hub-to-wearable device distance values from hubs near (e.g., within wireless range of) the care provider's wearable device at the time the care provider enters her current location; transform the care provider's confirmed location in a waypoint; and then generate a fingerprint for the waypoint from the hub-to-wearable device distance values. However, the system can implement any other methods or techniques to generate a database of fingerprints corresponding to various waypoints (i.e., reference points) throughout the facility.

Following population of a lookup table or other fingerprint database with a set of fingerprints and once care providers and residents within the facility are issued wearable devices, the system can match hub-to-wearable device distance values to preset fingerprints stored in the lookup table or fingerprint database to determine locations of care provider and resident wearable devices throughout the facility. For example, the system can identify a particular fingerprint—in the fingerprint database—containing hub-to-wearable device distance values nearest new hub-to-wearable device distance values of a particular wearable device and can thus determine that the current location of the particular wearable device is the location of the corresponding waypoint. In another example, the system can: identify two or more fingerprints containing hub-to-wearable device distance values originating from the same hubs and nearest the hub-to-wearable device distance values for a particular wearable device; and then interpolate the current location of the particular wearable device from the real locations of corresponding waypoints.

In yet another implementation, the system can: implement methods and techniques described above to generate an initial estimated location of a particular wearable device; select two or more waypoints nearest the initial estimated location of the particular wearable device and corresponding fingerprints; and then refine the estimated location of the particular wearable device by interpolating between fingerprints of the selected waypoints. Similarly, the system can: implement methods and techniques described above to calculate a location of a particular wearable device based on hub-to-wearable device distance values received from a set of hubs and designating the particular wearable device; select two or more waypoints nearest the calculated location of the particular wearable device and corresponding fingerprints; and then calculate a confidence score for the calculated location based on an secondary location interpolated from fingerprints of the selected waypoints and the hub-to-wearable device distance values. In this implementation, if the confidence score for the calculated location of the resident wearable device is less than a threshold confidence, the system can identify outliers in the hub-to-wearable device distance values and repeat the foregoing methods and techniques to recalculate the location of the resident's wearable device. However, the system can implement any other methods or techniques to generate and implement fingerprints of waypoints throughout a facility.

11. Error Detection

In one variation, the system detects errors in a determined location of a particular resident wearable device by comparing a distance between a current and a last location of the particular resident wearable device and a distance possible for the resident to traverse over the same period of time. In one implementation, the system calculates a speed of the resident moving throughout the facility based on a distance and time between the current and last determined locations of the resident. The system then compares this calculated speed of the resident with a resident mobility limit to confirm that the distance between the current and last determined locations of the resident is possible for the resident to traverse in the interval between the current and last determined resident locations. For example, the system can compare the measured speed of the resident to a general 3 mph maximum walking speed for geriatric residents. In another example, the system can: pass the UUID of the resident's wearable device through a name mapping system to identify the resident and the resident's mobility status; select one of a 3 mph maximum walking speed if the resident is able to walk, a 5 mph maximum rolling speed if the resident is bound to a wheel chair, or a 1.5 mph maximum walking speed if the resident walks with a walker or crutches; and then compare the measured speed of the resident to the selected maximum walking speed for the resident to confirm or refute that the current and last determined locations of the resident may be true.

The system can implement the foregoing methods and techniques to compare the current determined location of the resident to one or more past locations of the resident, such as the last five locations of the resident or locations of the resident determined in the past ten minutes. The system can thus plot a sequence of locations of the resident throughout this period of time, identify outliers in this sequence of locations based on distance between locations that exceed a distance that the resident could possibly traverse in the same period of time, and remove these outliers from the sequence. Alternatively, the system can correct an outlier location, such as by averaging adjacent locations or interpolating between adjacent locations in the sequence.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for tracking locations of residents within an assisted-care facility comprising:
  accessing a signal strength for a first wireless signal transmitted by a first wearable device and received by a first hub arranged within the assisted-care facility, wherein the first wireless signal is transmitted at a transmit power, which is known by at least one of a computer system, which is remote from the first hub and the first wearable device, or the first hub;
  transforming the signal strength into a first distance value representing a first distance from the first hub arranged within the assisted-care facility to the first wearable device based on the transmit power at a first time;
  accessing a first pressure value recorded by the first wearable device at approximately the first time and representing a local pressure proximal the first wearable device at approximately the first time;
  accessing a second pressure value recorded by the first hub at approximately the first time and representing a local pressure proximal the first hub at approximately the first time;
  calculating a vertical position of the first wearable device within the assisted-care facility at approximately the first time based on a difference between the first pressure value and the second pressure value;
  calculating a location within the assisted-care facility occupied by the first wearable device at approximately the first time based on the first distance value and the vertical position occupied by the first wearable device at approximately the first time; and
  recording the location, a timestamp for the first time, and a first identifier assigned to the first wearable device to a database.

2. The method of claim 1:
  wherein the computer system receives, from the first hub, the signal strength for the first wireless signal and the first identifier of the first wearable device and transforms the signal strength into the first distance value, which includes an approximate minimum distance between the first wearable device and the first hub;
  wherein accessing the first pressure value comprises, at the computer system, receiving the first pressure value recorded at a barometric pressure sensor integrated into the first wearable device and communicated wirelessly from the first wearable device to the at least one of the computer system via the first hub;
  wherein accessing the second pressure value comprises, at the computer system, receiving the second pressure value recorded at a barometric pressure sensor integrated into the first hub and communicated wirelessly from the first hub to the at least one of the computer system;
  wherein calculating the vertical position of the first wearable device within the assisted-care facility at approximately the first time comprises, at the computer system, calculating the vertical position of the first wearable device within the assisted-care facility at approximately the first time;
  wherein calculating the location within the assisted-care facility occupied by the first wearable device at approximately the first time comprises, at the computer system, triangulating a latitude, a longitude, and an altitude of the first wearable device based on the approximate minimum distance and the vertical position; and
  wherein recording the location, the timestamp for the first time, and the first identifier of the first wireless device to the database comprises recording the latitude, the longitude, the altitude, the timestamp for the first time, and the first identifier assigned to the first wearable device to the database hosted by the at least one of the computer system.

3. The method of claim 1 further comprising:
  accessing a second distance value representing a distance from a second hub arranged within the assisted-care facility to the first wearable device based on a second wireless signal transmitted between the first wearable device and the second hub at the first time, the first hub arranged on a first floor of the assisted-care facility, the second hub arranged on a second floor of the assisted-care facility distinct from the first floor;
  accessing a third pressure value recorded by the second hub at approximately the first time and representing a local pressure proximal the second hub at approximately the first time;
  wherein calculating the vertical position of the first wearable device comprises calculating the vertical position of the first wearable device within the first floor of the assisted-care facility in response to a difference between the first pressure value and the third pressure value exceeding the difference between the first pressure value and the second pressure value; and
  wherein calculating the location within the assisted-care facility occupied by the first wearable device at approximately the first time comprises, in response to the vertical position of the first wearable device falling within the first floor;
  rejecting the second distance value; and
  calculating the location within the assisted-care facility occupied by the first wearable device at approximately the first time based on the first distance value and the vertical position occupied by the first wearable device at approximately the first time.

4. The method of claim 3 further comprising, accessing a known vertical position of the first hub within the assisted-care facility; and
  wherein calculating the vertical position of the first wearable device within the assisted-care facility at approximately the first time comprises:
  in response to the first pressure value exceeding the second pressure value and remaining within a range of pressures corresponding to pressures expected for the first floor on which the first hub is arranged:
    calculating an orientation occupied by the first wearable device at approximately the first time as below the known vertical position of the first hub; and calculating the vertical position of the first wearable device within a same floor of the assisted-care facility as the first hub;

in response to the first pressure value falling below the second pressure value and remaining within the range of pressures:

calculating the orientation of the first wearable device at approximately the first time as above the known vertical position of the first hub;

calculating the vertical position of the first wearable device within the same floor of the assisted-care facility as the first hub;

wherein recording the location, the timestamp for the first time, and the first identifier assigned to the first wearable device to the database comprises recording the orientation of the first wearable device; and further comprising notifying a care provider to assist a resident assigned to the first wearable device in response to the orientation of the first wearable device falling below the known vertical position of the first hub.

5. The method of claim 1 further comprising:

accessing historical pressure data from the first hub; and compiling the historical pressure data into a range of pressure values corresponding to a first region of a first floor of the assisted-care facility occupied by the first hub;

wherein calculating the vertical position of the first wearable device within the assisted-care facility at approximately the first time comprises:

in response to the first pressure value falling within the range of pressure values, identifying the first wearable device as occupying the first floor of the assisted-care facility at approximately the first time; and calculating a vertical offset between the first wearable device and the first hub based on a difference between the first pressure value and the second pressure value;

wherein calculating the location within the assisted-care facility occupied by the first wearable device at approximately the first time comprises:

triangulating a latitude, a longitude, an altitude of the first wearable device relative to the first hub based on the vertical offset and the first distance value; and transforming the latitude, the longitude, the altitude of the first wearable device relative to the first hub into a latitude, a longitude, an altitude of the first wearable device relative to the assisted-care facility based on a known location of the first hub within the assisted-care facility;

wherein recording the location, the timestamp for the first time, and the first identifier assigned to the first wearable device to the database comprises recording the latitude, the longitude, and the altitude to the database.

6. The method of claim 5:

wherein triangulating the latitude, the longitude, the altitude of the first wearable device relative to the first hub comprises extracting a volume of possible locations of the wearable device relative to the first hub; and wherein transforming the latitude, the longitude, the altitude of the first wearable device relative to the first hub into the latitude, the longitude, the altitude of the first wearable device relative to the assisted-care facility comprises transforming the volume of possible locations of the wearable device relative to the first hub into coordinates of the assisted-care facility based on the known location of the first hub within the assisted-care facility.

7. The method of claim 1 further comprising:

accessing a second distance value representing a distance from a second hub arranged within the assisted-care facility to the first wearable device based on a second wireless signal transmitted between the first wearable device and the second hub at approximately the first time, the second hub on a same floor as the first hub;

wherein calculating the vertical position of the first wearable device within the assisted-care facility at approximately the first time comprises:

in response to the first pressure value falling within a threshold range of the second pressure value, identifying the first wearable device as occupying the same floor of the assisted-care facility as the first hub and the second hub at approximately the first time; and calculating a first vertical offset between the first wearable device and the first hub based on a difference between the first pressure value and the second pressure value; and wherein calculating the location within the assisted-care facility occupied by the first wearable device at approximately the first time comprises:

estimating a volume of possible locations of the first wearable device based on the first distance value and the second distance value; and triangulating a latitude and a longitude corresponding to an intersection between the first wireless signal and the second wireless signal based on the first distance value and the second distance value.

8. The method of claim 7 further comprising:

accessing a third distance value representing a distance from a third hub arranged within the assisted-care facility to the first wearable device based on a third wireless signal transmitted between the first wearable device and the third hub at approximately the first time, the third hub on a same floor as the first hub and the second hub;

wherein calculating the location within the assisted-care facility occupied by the first wearable device at approximately the first time comprises:

triangulating the latitude, the longitude, and an altitude of the first wearable device within the assisted-care facility corresponding to an intersection between the first wireless signal, the second wireless signal, and the third wireless signal based on the first distance value, the second distance value, and the third distance value; and confirming the altitude of the first wearable device relative to the first hub based on the vertical position of the first wearable device within the assisted-care facility.

9. The method of claim 7:

wherein recording the location, the timestamp for the first time, and the first identifier assigned to the first wearable device to the database comprises, logging the location, the timestamp for the first time, and the first wearable device identifier within a temporal map representing resident locations in the assisted-care facility over a time window; and further comprising serving the temporal map to a computing device affiliated with a care provider of residents within the assisted-care facility.

10. The method of claim 9, further comprising:

detecting a fall event by the first wearable device at the location of the assisted-care facility;

wherein logging the location, the timestamp for the first time, and the first wearable device identifier within the temporal map comprises logging the location, the timestamp for the first time, the first identifier assigned to the first wearable device, and the fall event within the temporal map; and wherein serving the temporal map to the computing device affiliated with the care provider of the residents within the assisted-care facility comprises, in response to the fall event, serving a work-order to the care provider to assist a resident assigned to the first wearable device at the location of the fall event.

11. The method of claim 1 further comprising:

accessing pressure data recorded by wearable devices, assigned to the residents within the assisted-care facility, at known locations within the assisted-care facility;

correlating the pressure data with the known locations within the assisted-care facility to generate a map of pressure data at various locations within the assisted-care facility;

wherein calculating the location within the assisted-care facility occupied by the first wearable device at approximately the first time comprises estimating the location of the first wearable device within the assisted-care facility at approximately the first time based on alignment between the first pressure value and pressure data represented in the map.

12. The method of claim 1 further comprising:

dispatching a care provider to a known location within the assisted-care facility;

accessing a second distance value representing a distance from the first hub to a care provider wearable device assigned to the care provider of the assisted-care facility based on a second wireless signal transmitted between the care provider wearable device at the known location and the first hub at a second time;

accessing a third pressure value recorded by the care provider wearable device at the known location at approximately the second time and representing a local pressure proximal the known location at approximately the second time;

compiling the third pressure value and the second distance value into a map representing pressure data at various locations within the assisted-care facility;

wherein calculating the location within the assisted-care facility occupied by the first wearable device at approximately the first time comprises estimating the location position of the first wearable device within the assisted-care facility at approximately the first time based on alignment between the first pressure value and pressure data represented in the map.

13. The method of claim 1 wherein the first hub transforms the signal strength into the first distance value and conveys the first distance value and the first identifier of the first wearable device to the at least one of the computer system.

14. A method for tracking locations of residents within an assisted-care facility comprising:

accessing pressure data recorded by wearable devices at known locations within the assisted-care facility;

correlating the pressure data with known locations within the assisted-care facility to generate a map of pressure data at various locations within the assisted-care facility;

accessing a first pressure value recorded by a first wearable device assigned to a first resident of the assisted-care facility at approximately the first time and representing a local pressure proximal the first wearable device at a first time;

estimating a first location of the first wearable device within the assisted-care facility at approximately the first time based on alignment between the first pressure value and pressure data represented in the map; and recording the first location, a timestamp for the first time, and a first resident identifier of the first resident assigned to the first wearable device to a database, wherein accessing the pressure data recorded by the wearable devices at the known locations within the assisted-care facility comprises accessing the pressure data recorded by each of the wearable devices, assigned to a respective resident of the residents of the assisted-care facility and representing a local pressure proximal the respective wearable device at a second time;

wherein correlating the pressure data recorded by each of the wearable devices with the known locations within the assisted-care facility to generate the map of pressure data at the various locations within the assisted-care facility comprises:

accessing a first distance value representing a distance from a first hub arranged within the assisted-care facility to each of the wearable devices wherein the first distance is determined based on a transmit power of a first wireless signal transmitted between the respective wearable device and the first hub at the second time over a time window; wherein the transmit power of the first wireless signal is known by at least one of a computer system, which is remote from the first hub and the respective wearable device or the first hub;

accessing a second distance value representing a distance from a second hub arranged within the assisted-care facility to each of the wearable devices wherein the second distance is determined based on the transmit power of a second wireless signal transmitted between the respective wearable device and the second hub at approximately the second time over the time window; wherein the transmit power of the second wireless signal is known by at least one of the computer system, which is remote from the second hub and the respective wearable device or the second hub;

accessing a third distance value representing a distance from a third hub arranged within the assisted-care facility to each of the wearable devices wherein the third distance is determined based on the transmit power of a third wireless signal transmitted between the respective wearable device and the third hub at approximately the second time over the time window; wherein the transmit power of the third wireless signal is known by at least one of the computer system, which is remote from the third hub and the respective wearable device or the third hub;

triangulating a latitude and a longitude of the respective wearable device within the assisted care facility based on the first distance value and the second distance value, and the third distance value;

estimating a vertical position of each of the wearable devices based on the pressure data recorded by each of the wearable devices relative to historical pressure data recorded by other wearable devices proximal the latitude and the longitude; and mapping the pressure value to the latitude, the longitude, and the vertical position corresponding to a location of each of the wearable devices within the assisted-care facility.

15. The method of claim 14:
wherein accessing the pressure data recorded by each of the wearable devices, assigned to the respective resident of the residents within the assisted-care facility, at known locations within the assisted-care facility comprises accessing the pressure data recorded by each of the wearable devices, assigned to the respective resident of the residents within the assisted-care facility, at known locations within the assisted-care facility at approximately the first time; and
wherein correlating the pressure data with the known locations within the assisted-care facility comprises correlating the pressure data recorded at approximately the first time with the known locations within the assisted-care facility to generate a map of the pressure data at various locations within the assisted-care facility at approximately the first time.

16. The method of claim 14:
wherein accessing the pressure data recorded by each of the wearable devices at the known locations within the assisted-care facility comprises accessing the pressure data recorded by wearable devices at known locations within a set of floors of the assisted-care facility;
wherein correlating the pressure data with the known locations within the assisted-care facility comprises generating a map of pressure data representing pressure values recorded within each floor in the set of floors of the assisted-care facility; and
wherein estimating the first location of the first wearable device within the assisted-care facility at approximately the first time comprises estimating a first floor, in the set of floors, occupied by the first resident assigned to the first wearable device at approximately the first time based on alignment between the first pressure value and pressure data represented within the first floor within the map.

17. The method of claim 16:
wherein accessing the pressure data recorded by each of the wearable devices at the known locations within the assisted-care facility comprises accessing the pressure data recorded by each of the wearable devices at known locations within a set of regions on the first floor;
wherein correlating the pressure data with the known locations within the assisted-care facility comprises generating a map of pressure data representing pressure values recorded within each region in the set of regions of the first floor of the assisted-care facility; and
wherein estimating the first location of the first wearable device within the assisted-care facility at approximately first time comprises estimating a first region, in the set of regions, occupied by the first resident assigned to the first wearable device at approximately the first time based on alignment between the first pressure value and pressure data represented within the first region within the map.

18. The method of claim 14:
wherein accessing the pressure data recorded by each of the wearable devices at the known locations within the assisted-care facility comprises:
dispatching a care provider to each known location the known locations within the assisted-care facility;
accessing a distance value representing a distance from a hub arranged within the assisted-care facility to a care provider wearable device assigned to the care provider of the assisted-care facility based on a wireless signal transmitted between the care provider wearable device at the known location and the hub at a second time; and
accessing a pressure value recorded by the care provider wearable device at the known location at approximately the second time and representing a local pressure proximal the known location at approximately the second time; and
wherein correlating the pressure data of each known location of the known locations within the assisted-care facility to generate a map of pressure data at various locations within the assisted-care facility comprises compiling the pressure value and the distance value into the map representing pressure data at various locations within the assisted-care facility.

19. The method of claim 14:
further comprising detecting a fall event by the first wearable device at the location of the assisted-care facility;
wherein recording the location, the timestamp for the first time, and the first identifier assigned to the first wearable device to the database comprises logging the location, the timestamp for the first time, the first identifier of the first wireless device, and the fall event within a temporal map representing resident locations and fall events in the assisted-care facility over a time window; and
further comprising:
serving the temporal map to a computing device affiliated with a care provider of the residents within the assisted-care facility; and
in response to the fall event, serving a work-order to the care provider to assist a resident assigned to the first wearable device at the location of the fall event.

* * * * *